(12) United States Patent
Arai et al.

(10) Patent No.: US 6,979,374 B2
(45) Date of Patent: *Dec. 27, 2005

(54) MAGNETIC POWDER, MANUFACTURING METHOD OF MAGNETIC POWDER AND BONDED MAGNETS

(75) Inventors: Akira Arai, Shimosuwa-machi (JP); Hiroshi Kato, Okaya (JP)

(73) Assignee: Seiko Epson Corporation (JP)

( * ) Notice: Subject to any disclaimer, the term of this patent is extended or adjusted under 35 U.S.C. 154(b) by 237 days.

This patent is subject to a terminal disclaimer.

(21) Appl. No.: 09/871,600

(22) Filed: May 31, 2001

(65) Prior Publication Data

US 2002/0036032 A1 Mar. 28, 2002

(30) Foreign Application Priority Data

May 31, 2000 (JP) ........................ 2000-162552

(51) Int. Cl.$^7$ ............................................ H01F 1/057
(52) U.S. Cl. .................. 148/302; 420/83; 420/121
(58) Field of Search ................... 148/302; 420/83, 420/121

(56) References Cited

U.S. PATENT DOCUMENTS

| | | | | |
|---|---|---|---|---|
| 4,684,406 A | * | 8/1987 | Matsuura et al. | 148/103 |
| 4,765,848 A | * | 8/1988 | Mohri et al. | 148/302 |
| 4,792,368 A | * | 12/1988 | Sagawa et al. | 148/302 |
| 4,836,868 A | * | 6/1989 | Yajima et al. | 148/302 |
| 5,716,462 A | * | 2/1998 | Sakurada et al. | 148/302 |
| 5,725,792 A | * | 3/1998 | Panchanathan | 148/104 |
| 5,872,501 A | | 2/1999 | Hamano et al. | |
| 6,352,599 B1 | * | 3/2002 | Chang et al. | 148/101 |
| 6,527,875 B2 | | 3/2003 | Arai et al. | 148/302 |
| 6,551,418 B2 | | 4/2003 | Arai et al. | 148/302 |
| 6,558,482 B1 | | 5/2003 | Arai et al. | 148/302 |

FOREIGN PATENT DOCUMENTS

| | | | | |
|---|---|---|---|---|
| EP | 0 302 395 | * | 2/1989 | |
| EP | 1 15 127 A | | 7/2001 | |
| EP | 1 115 126 A | | 7/2001 | |
| EP | 1 162 634 A | | 12/2001 | |
| JP | 01205403 A | | 8/1989 | |
| JP | 01-205403 | | 8/1989 | |
| JP | 3-196502 | * | 8/1991 | 148/302 |
| JP | 3-236202 | * | 10/1991 | 148/302 |
| JP | 6-231926 | * | 8/1994 | 148/302 |
| JP | 08335506 A | | 12/1996 | |
| JP | 10-53844 | | 2/1998 | |
| JP | 10-177911 | | 6/1998 | |
| JP | 10-265915 | | 10/1998 | |
| JP | 63-292601 | * | 11/1998 | 148/302 |
| JP | 11-288807 | | 10/1999 | |
| JP | 2001-035712 | | 2/2001 | |

OTHER PUBLICATIONS

Wang, Z. et al, "High–coercivity (NdDy)2(FeNb)14B–ALPHA–Fe nanocrystalline alloys", Journal of Applied Physics, American Institute of Physics, New York, US, vol. 81, No. 8, PART 2B, Apr. 15, 1997, pp. 5097–5099.

European Patent Office Search Report.

Goll, D. et al, Journal of Magnetism and Magnetic Materials, "Magnetic and Microstructural Properties of Nanocrystalline Exchange Coupled PrFeB Permanent Magnets", 185 (1998) pp. 49–60.

Change, W.C. et al, "Magnetic Properties Enhancement of Alpha–Fe/Nd2Fe14B–Type Nanocomposites by Co Substitution", Journal of Applied Physics, American Institute of Physics, New York, vol. 83, No. 4, Feb. 1998, pps. 2147–2151.

* cited by examiner

*Primary Examiner*—John P. Sheehan
(74) *Attorney, Agent, or Firm*—Harness, Dickey & Pierce, P.L.C.

(57) ABSTRACT

Disclosed herein is a magnetic powder which can provide magnets having excellent magnetic properties and having excellent reliability especially excellent heat stability. The magnetic powder is composed of an alloy composition represented by $R_x(Fe_{1-a}Co_a)_{100-x-y-z}B_yM_z$ (where R is at least one kind of rare-earth element excepting Dy, M is at least one kind of element selected from Ti, Cr, Nb, Mo, Hf, W, Mn, Zr and Dy, x is 7.1–9.9 at %, y is 4.6–8.0 at %, z is 0.1–3.0 at %, and a is 0–0.30, and the magnetic powder being constituted from a composite structure having a soft magnetic phase and a hard magnetic phase, wherein when the magnetic powder is mixed with a binding resin and then the mixture is subjected to compaction molding to form a bonded magnet having a density $\rho[Mg/m^3]$, the maximum magnetic energy product $(BH)_{max}[kJ/m^3]$ of the bonded magnet at a room temperature satisfies the relationship represented by the formula $(BH)_{max}/\rho^2[\times 10^{-9}\ Jm^3/g^2]$ 2.40, and the intrinsic coercive force $H_{CJ}$ of the bonded magnet at a room temperature is in the range of 400–750 kA/m.

18 Claims, 5 Drawing Sheets

MAGNETIC POWDER, MANUFACTURING METHOD OF MAGNETIC POWDER AND BONDED MAGNETS

BACKGROUND OF THE INVENTION

1. Field of the Invention

The present invention relates to magnetic powder, a manufacturing method of magnetic powder and bonded magnets. More particularly, the present invention relates to magnetic powder, a manufacturing method of the magnetic powder and a bonded magnet which is produced, for example, using the magnetic powder.

2. Description of the Prior Art

For reduction in size of motors, it is desirable that a magnet has a high magnetic flux density (with the actual permeance) when it is used in the motor. Factors for determining the magnetic flux density of a bonded magnet include magnetization of the magnetic powder and the content of the magnetic powder to be contained in the bonded magnet. Accordingly, when the magnetization of the magnetic powder itself is not sufficiently high, a desired magnetic flux density cannot be obtained unless the content of the magnetic powder in the bonded magnet is raised to an extremely high level.

At present, most of practically used high performance rare-earth bonded magnets are the isotropic bonded magnets which are made using the MQP-B powder manufactured by MQI Inc. as the rare-earth magnetic powder thereof. The isotropic bonded magnets are superior to the anisotropic bonded magnets in the following respect; namely, in the manufacture of the bonded magnet, the manufacturing process can be simplified because no magnetic field orientation is required, and as a result, the rise in the manufacturing cost can be restrained. On the other hand, however, the conventional isotropic bonded magnets represented by those manufactured using the MQP-B powder involve the following problems.

(1) The conventional isotropic bonded magnets do not have a sufficiently high magnetic flux density. Namely, because the magnetic powder that has been used has poor magnetization, the content of the magnetic powder to be contained in the bonded magnet has to be increased. However, the increase in the content of the magnetic powder leads to the deterioration in the moldability of the bonded magnet, so there is a certain limit in this attempt. Moreover, even if the content of the magnetic powder is somehow managed to be increased by changing the molding conditions or the like, there still exists a limit to the obtainable magnetic flux density. For these reasons, it is not possible to reduce the size of the motor by using the conventional isotropic bonded magnets.

(2) Although there are reports concerning nanocomposite magnets having high remanent magnetic flux densities, their coercive forces, on the contrary, are so small that the magnetic flux densities (for the permeance in the actual use) obtainable when they are practically used in motors are very low. Further, these magnets have poor heat stability due to their small coercive forces.

(3) The conventional bonded magnets have low corrosion resistance and heat resistance. Namely, in these magnets, it is necessary to increase the content of the magnetic powder to be contained in the bonded magnet in order to compensate the low magnetic properties (magnetic performance) of the magnetic powder. This means that the density of the bonded magnet becomes extremely high. As a result, the corrosion resistance and heat resistance of the bonded magnet are deteriorated, thus resulting in low reliability.

SUMMARY OF THE INVENTION

It is therefore an object of the present invention to provide magnetic powder that can manufacture bonded magnets having excellent magnetic properties and having excellent reliability.

In order to achieve the above object, the present invention is directed to magnetic powder composed of an alloy composition represented by $R_x(Fe_{1-a}Co_a)_{100-x-y-z}B_yM_z$ (where R is at least one kind of rare-earth element excepting Dy, M is at least one kind of element selected from Ti, Cr, Nb, Mo, Hf, W, Mn, Zr and Dy, x is 7.1–9.9 at %, y is 4.6–8.0 at %, z is 0.1–3.0 at %, and a is 0–0.30, and the magnetic powder being constituted from a composite structure having a soft magnetic phase and a hard magnetic phase, wherein when the magnetic powder is mixed with a binding resin and then the mixture is subjected to compaction molding to form a bonded magnet having a density $\rho[Mg/m^3]$, the maximum magnetic energy product $(BH)_{max}[kJ/m^3]$ of the bonded magnet at a room temperature satisfies the relationship represented by the formula of $(BH)_{max}/\rho^2[\times10^{-9} \text{ J}\cdot\text{m}^3/\text{g}^2] \geq 2.40$, and the intrinsic coercive force $H_{CJ}$ of the bonded magnet at a room temperature is in the range of 400–750 kA/m.

According to the magnetic powder as described above, it is possible to provide bonded magnets having excellent magnetic properties as well as excellent reliability.

In this magnetic powder, it is preferred that the remanent magnetic flux density Br[T] of the bonded magnet at a room temperature satisfies the relationship represented by the formula of $Br/\rho[\times10^{-6} \text{ T}\cdot\text{m}^3/\text{g}] \geq 0.125$. This makes it possible to provide bonded magnets having especially excellent magnetic properties and reliabilities.

Another aspect of the present invention is also directed to a magnetic powder composed of an alloy composition represented by $R_x(Fe_{1-a}Co_a)_{100-x-y-z}B_yM_z$ (where R is at least one kind of rare-earth element excepting Dy, M is at least one kind of element selected from Ti, Cr, Nb, Mo, Hf, W, Mn, Zr and Dy, x is 7.1–9.9 at %, y is 4.6–8.0 at %, z is 0.1–3.0 at %, and a is 0–0.30, and the magnetic powder being constituted from a composite structure having a soft magnetic phase and a hard magnetic phase, wherein when the magnetic powder is mixed with a binding resin and then the mixture is subjected to compaction molding to form a bonded magnet having a density $\rho[Mg/m^3]$, the remanent magnetic flux density Br[T] of the bonded magnet at a room temperature satisfies the relationship represented by the formula of $Br/\rho[\times10^{-6} \text{ T}\cdot\text{m}^3/\text{g}] \geq 0.125$ and the intrinsic coercive force $H_{CJ}$ of the bonded magnet at a room temperature is in the range of 400–750 kA/m.

According to the magnetic powder as described above, it is also possible to provide bonded magnets having excellent magnetic properties as well as excellent reliability.

In the present invention, it is preferred that the magnetic powder is obtained by milling a melt spun ribbon. This makes it possible to further improve magnetic properties, especially coercive force and the like.

Further, it is also preferred that the thickness of the melt spun ribbon is 10–40 μm. This also makes it possible to obtain bonded magnets having especially excellent magnetic properties.

Preferably, the melt spun ribbon is obtained by colliding a molten alloy of a magnetic material onto a circumferential surface of a cooling roll which is rotating to cool and then solidify it. According to this method, it is possible to obtain microstructure (fine crystal grains) with relative ease, so that the magnetic properties can be further improved.

In this case, it is preferred that the cooling roll includes a roll base made of a metal or an alloy and an outer surface layer provided on an outer peripheral portion of the roll base to constitute the circumferential surface, in which the outer surface layer of the cooling roll has a heat conductivity lower than the heat conductivity of the roll base. This makes it possible to quench the puddle of the magnetic material with an adequate cooling rate, so that it becomes possible to obtain magnets having especially excellent magnetic properties.

In this case, it is preferred that the outer surface layer of the cooling roll is formed of a ceramics. This also makes it possible to quench the puddle of the magnetic material with an adequate cooling rate, so that it becomes possible to obtain magnets having especially excellent magnetic properties. Further, the durability of the cooling roll is also improved.

In the present invention, it is preferred that the R comprises rare-earth elements mainly containing Nd and/or Pr. This makes it possible to improve saturation magnetization of the hard phase of the composite structure (in particular, nanocomposite structure), and thereby the coercive force is further enhanced.

Further, it is also preferred that said R includes Pr and its ratio with respect to the total mass of said R is 5–75%. This makes it possible to improve the coercive force and rectangularity without lowering the remanent magnetic flux density.

In the present invention, it is also preferred that the magnetic powder is constituted from a composite structure having a soft magnetic phase and a hard magnetic phase. This makes it possible to improve magnetizability as well as heat resistance (heat stability) so that changes in the magnetic properties with the elapse of time become small.

Further, it is also preferred that the magnetic powder is subjected to a heat treatment for at least once during the manufacturing process or after its manufacturing. According to this, homogeneity (uniformity) of the structure can be obtained and influence of stress introduced by the milling process can be removed, thereby enabling to further improve the magnetic properties of the bonded magnet.

In the magnetic powders described above, it is preferred that the mean crystal grain size is 5–50 nm. This makes it possible to obtain magnets having excellent magnetic properties, especially excellent coercive force and rectangularity.

Further, in the magnetic powders described above, it is also preferred that the average particle size lies in the range of 0.5–150 μm. This makes it possible to further improve the magnetic properties. Further, when the magnetic powder is used in manufacturing bonded magnets, it is possible to obtain bonded magnets having a high content of the magnetic powder and having excellent magnetic properties.

Further, the present invention is directed to a method of manufacturing magnetic powder, in which a melt spun ribbon is obtained by colliding a molten alloy of a magnetic material onto a circumferential surface of a cooling roll which is rotating to cool and then solidify it, and then thus obtained melt spun ribbon is milled to obtain the magnetic powder, wherein the magnetic powder composed of an alloy composition represented by $R_x(Fe_{1-a}Co_a)_{100-x-y-z}B_yM_z$ (where R is at least one kind of rare-earth element excepting Dy, M is at least one kind of element selected from Ti, Cr, Nb, Mo, Hf, W, Mn, Zr and Dy, x is 7.1–9.9 at %, y is 4.6–8.0 at %, z is 0.1–3.0 at %, and a is 0–0.30, and the magnetic powder being constituted from a composite structure having a soft magnetic phase and a hard magnetic phase, wherein when the magnetic powder is mixed with a binding resin and then the mixture is subjected to compaction molding to form a bonded magnet having a density $\rho[Mg/m^3]$, the maximum magnetic energy product $(BH)_{max}$ $[kJ/m^3]$ of the bonded magnet at a room temperature satisfies the relationship represented by the formula of $(BH)_{max}/\rho^2$ $[\times 10^{-9}\ J \cdot m^3/g^2] \geq 2.40$, and the intrinsic coercive force $H_{CJ}$ of the bonded magnet at a room temperature is in the range of 400–750 kA/m.

According to this method, it is possible to provide magnetic powder having excellent magnetic properties and having excellent reliability.

Further, the present invention is also directed to a method of manufacturing magnetic powder, in which a melt spun ribbon is obtained by colliding a molten alloy of a magnetic material onto a circumferential surface of a cooling roll which is rotating to cool and then solidify it, and then thus obtained melt spun ribbon is milled to obtain the magnetic powder, wherein the magnetic powder composed of an alloy composition represented by $R_x(Fe_{1-a}Co_a)_{100-x-y-z}B_yM_z$ (where R is at least one kind of rare-earth element excepting Dy, M is at least one kind of element selected from Ti, Cr, Nb, Mo, Hf, W, Mn, Zr and Dy, x is 7.1–9.9 at %, y is 4.6–8.0 at %, z is 0.1–3.0 at %, and a is 0–0.30, and the magnetic powder being constituted from a composite structure having a soft magnetic phase and a hard magnetic phase, wherein when the magnetic powder is mixed with a binding resin and then the mixture is subjected to compaction molding to form a bonded magnet having a density $\rho[Mg/m^3]$, the remanent magnetic flux density $Br[T]$ of the bonded magnet at a room temperature satisfies the relationship represented by the formula of $Br/\rho[\times 10^{-6}\ T \cdot m^3/g] \geq 0.125$ and the intrinsic coercive force $H_{CJ}$ of the bonded magnet at a room temperature is in the range of 400–750 kA/m.

According to this method, it is also possible to provide magnetic powder having excellent magnetic properties and having excellent reliability.

Furthermore, the present invention is directed to a bonded magnet manufactured by mixing magnetic powder with a binding resin and then subjecting the mixture to compaction molding, in which the magnetic powder is composed of an R-TM-B based alloy having at least one element selected from Ti, Cr, Nb, Mo, Hf, W, Mn, Zr and Dy (where R is at least one kind of rare-earth element excepting Dy, and TM is a transition metal mainly containing Fe), the bonded magnet being characterized in that when a density of the bonded magnet is $\rho[Mg/m^3]$, the maximum magnetic energy product $(BH)_{max}[kJ\ m^3]$ of the bonded magnet at a room temperature satisfies the relationship represented by the formula of $(BH)_{max}/\rho^2[\times 10^{-9}\ J \cdot m^3/g^2] \geq 2.40$, and the intrinsic coercive force $H_{CJ}$ of the bonded magnet at a room temperature is in the range of 400–750 kA/m.

According to the bonded magnet described above, it is possible to obtain bonded magnets having excellent magnetic properties and having excellent reliability.

In this bonded magnet, it is preferred that the remanent magnetic flux density $Br[T]$ of the bonded magnet at a room temperature satisfies the relationship represented by the formula of $Br/\rho[\times 10^{-6}\ T \cdot m^3/g] \geq 0.125$. This makes it possible to provide bonded magnets having especially excellent magnetic properties and reliabilities.

Further, the present invention is directed to a bonded magnet manufactured by mixing magnetic powder with a binding resin, and then subjecting the mixture to compaction molding, wherein the magnetic powder being composed of an R-TM-B based alloy having at least one element selected from Ti, Cr, Nb, Mo, Hf, W, Mn, Zr and Dy (where R is at least one kind of rare-earth element excepting Dy, and TM is a transition metal mainly containing Fe), the bonded magnet being characterized in that when the density of the bonded magnet is $\rho[\text{Mg/m}^3]$, the remanent magnetic flux density $Br[T]$ of the bonded magnet at a room temperature satisfies the relationship represented by the formula of $Br/\rho[\times 10^{-6} \text{ T}\cdot\text{m}^3/\text{g}] \geq 0.125$, and the intrinsic coercive force $H_{CJ}$ of the bonded magnet at a room temperature is in the range of 400–750 kA/m.

According to the bonded magnet described above, it is also possible to obtain bonded magnets having excellent magnetic properties and having excellent reliability.

In these bonded magnets, it is preferred that the magnetic powder is composed of an alloy composition represented by $R_x(Fe_{1-a}Co_a)_{100-x-y-z}B_yM_z$ (where R is at least one kind of rare-earth element excepting Dy, M is at least one kind of element selected from Ti, Cr, Nb, Mo, Hf, W, Mn, Zr and Dy, x is 7.1–9.9 at %, y is 4.6–8.0 at %, z is 0.1–3.0 at %, and a is 0–0.30, and the magnetic powder is constituted from a composite structure having a soft magnetic phase and a hard magnetic phase. This also makes it possible to provide bonded magnets having especially excellent magnetic properties and reliabilities.

Further, in these bonded magnets, it is also preferred that the compaction molding is carried out under the temperature that the binding resin is melted or softened. According to this, moldability of the bonded magnet is improved while void ratio of the bonded magnet is lowered, so that magnetic properties can be further improved. Further, mechanical strength of the bonded magnet is also improved.

Furthermore, it is also preferred that the maximum magnetic energy product $(BH)_{max}[\text{kJ/m}^3]$ is equal to or greater than 50 kJ/m$^3$. This makes it possible to obtain small sized and high performance motors.

Moreover, it is also preferred that the absolute value of the irreversible flux loss (initial flux loss) is less than 6.2%. This makes it possible to obtain bonded magnets having especially excellent heat resistance (heat stability).

These and other objects, structures and advantages of the present invention will be apparent from the following detailed description of the invention and the examples thereof which proceeds with reference to the accompanying drawings.

DETAILED DESCRIPTION OF THE INVENTION

Figure 1:
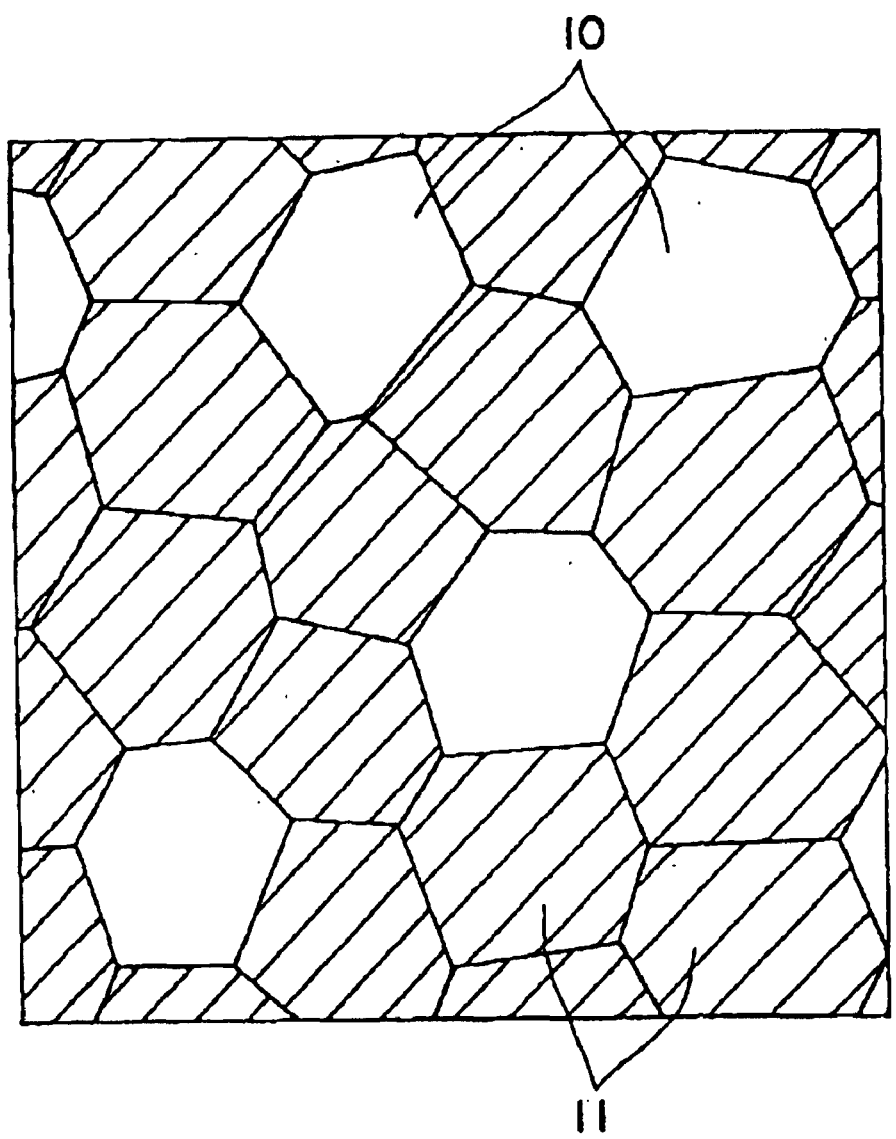
FIG. 1 is an illustration which schematically shows one example of a composite structure (nanocomposite structure) of magnetic powder according to the present invention.

In the following, embodiments of the magnetic powder according to this invention, the manufacturing method of the magnetic powder and the bonded magnet formed from the magnetic powder will be described in detail.

General Description of the Invention

At present, a magnet having high magnetic flux density is practically required in order to reduce the size of motors or other electrical devices. In bonded magnets, factors that determine the magnetic flux density are the magnetization of magnetic powder and the content (compositional ratio) of the magnetic powder to be contained in the bonded magnet. When the magnetization of the magnetic powder itself is not so high, a desired magnetic flux density cannot be obtained unless the content of the magnetic powder in the bonded magnet is increased to an extremely high level.

As described in the above, the MQP-B powder made by MQI Inc. which is now being widely used can not provide sufficient magnetic flux density depending on its use. As a result, in manufacturing the bonded magnets, it is required to increase the content of the magnetic powder in the bonded magnet, that is, it is required to increase the magnetic flux density. However, this in turn leads to the lack of reliability in the corrosion resistance, heat resistance and mechanical strength thereof and the like. Further, there is also a problem in that the obtained magnet has a poor magnetizability due to its high coercive force.

In contrast, the magnetic powder and the bonded magnet according to this invention can obtain a sufficient magnetic flux density and an adequate coercive force. As a result, without extremely increasing the content of the magnetic powder in the bonded magnet, it is possible to provide a bonded magnet having high strength and having excellent moldability, corrosion resistance and magnetizability. This makes it possible to reduce the size of the bonded magnet and increase its performance, thereby contributing to reduction in size of motors and other devices employing magnets.

Further, the magnetic powder of the present invention may be formed so as to constitute a composite structure having a hard magnetic phase and a soft magnetic phase.

While the MQP-B powder made by MQI Inc. described above is a single phase structure of a hard magnetic phase, the magnetic powder of the present invention has the composite structure which also has a soft magnetic phase with high magnetization. Accordingly, the magnetic powder of the present invention has an advantage in that the total magnetization of the system as a whole is high. Further, since the recoil permeability of the bonded magnet becomes high, there is an advantage in that, even after a reverse magnetic field has been applied, the demagnetization factor remains small.

Alloy Composition of Magnetic Powder

The magnetic powder according to the present invention is composed of an alloy composition containing at least one kind of element selected from Ti, Cr, Nb, Mo, Hf, W, Mn, Zr and Dy. According to such magnetic powder, coercive force can be improved, and heat resistance and corrosion resistance can also be improved. In particular, it is preferable that the magnetic powder is composed of an R-TM-B based alloy having at least one element selected from Ti, Cr, Nb, Mo, Hf, W, Mn, Zr and Dy (where R is at least one kind of rare-earth element excepting Dy, and TM is a transition metal mainly containing Fe). Further, it is more preferable that the magnetic powder is composed of an alloy composition represented by $R_x(Fe_{1-a}Co_a)_{100-x-y-z}B_yM_z$ (where R is at least one kind of rare-earth element excepting Dy, M is at least one kind of element selected from Ti, Cr, Nb, Mo, Hf, W, Mn, Zr and Dy, x is 7.1–9.9 at %, y is 4.6–8.0 at %, z is 0.1–3.0 at %, and a is 0–0.30.

Examples of R (at least one kind of rare-earth element excepting Dy) Y, La, Ce, Pr, Nd, Pm, Sm, Eu, Gd, Tb, Ho, Er, Tm, Yb, Lu, and a misch metal, and one or more of these rare-earth elements may be contained.

The content of R is in the range of 7.1–9.9 at %. When the content of R is less than 7.1 at %, sufficient coercive force can not be obtained, and even if M is added, improvement of the coercive force can not be hardly attained. On the other hand, when the content of R exceeds 9.9 at %, potential of magnetization is lowered, so that a sufficient magnetic flux density can not be obtained.

Here, it is preferable that R includes the rare-earth elements Nd and/or Pr as its principal ingredient. The reason for this is that these rare-earth elements enhance the saturation magnetization of the hard magnetic phase which constitutes the composite structure (especially, nanocomposite structure), and are effective in realizing a satisfactory coercive force as a magnet.

Moreover, it is preferable that R includes Pr and its ratio to the total mass of R is 5–75%, and more preferably 20–60%. This is because when the ratio lies within this range, it is possible to improve the coercive force (coercivity) and the rectangularity by hardly causing a drop in the remanent magnetic flux density.

Cobalt (Co) is a transition metal element having properties similar to Fe. By adding Co, that is by substituting a part of Fe by Co, the Curie temperature is elevated and the temperature characteristic of the magnetic powder is improved. However, if the substitution ratio of Fe by Co exceeds 0.30, both of the coercive force and the magnetic flux density tend to fall off. The range of 0.05–0.20 of the substitution ratio of Fe by Co is more preferable since in this range not only the temperature characteristic of the magnetic powder but also the magnetic flux density thereof are improved.

Boron (B) is an element which is important for obtaining high magnetic properties, and its content is set to 4.6–8.0 at %. If the content of B is less than 4.6 at %, the rectangularity of the B-H (J-H) loop is deteriorated. On the other hand, if the content of B exceeds 8.0 at %, the nonmagnetic phase increases and thereby the magnetic flux density drops sharply.

M is an element which is advantageous for enhancing the coercive force. In this regard, it is preferable that the content of M is in the range of 0.2–2.5 at %, and it is more preferable that the content is in the range of 0.5–2.0 at %. By containing M of such a range, prominent coercive force enhancement effect is realized. Further, containing M of such a range also improves the rectangularity and the maximum magnetic energy product together with the coercive force. Furthermore, heat resistance and corrosion resistance are also improved. However, as described above, when the content of R is less than 7.1 at %, such an effect derived from addition of M is very small. On the other hand, when the content of M exceeds the above upper limit, magnetization is lowered.

Of course, M itself is a known substance. However, in the present invention, it has been found through repeatedly conducted experiments and researches that by containing M within the above range to the magnetic powder constituted from a composite structure having a soft magnetic phase and a hard magnetic phase, the following three effects are realized, in particular these three effects are realized at the same time, and this is the significance of the present invention.

(1) The coercive force of the magnetic powder can be improved while maintaining the excellent rectangularity and the maximum magnetic energy product.
(2) The irreversible flux loss can be improved, that is the absolute value thereof can be lowered.
(3) Better corrosion resistance can be maintained.

In addition, for the purpose of further improving the magnetic properties, at least one other element selected from the group comprising Ta, Zn, P, Ge, Cu, Ga, Si, In, Ag and Al (hereinafter, referred to as "Q") may be contained as needed. When containing the element belonging to Q, it is preferable that the content thereof should be equal to or less than 2.0 at %, and it is more preferable that the content thereof lies within the range of 0.1–1.5 at %, and it is furthermore preferable that the content thereof lies within the range of 0.2–1.0 at %.

The addition of the element belonging to Q makes it possible to exhibit an inherent effect of the kind of the element. For example, the addition of Ta, Cu, Ga, Si or Al exhibits an effect of improving the corrosion resistance.

Composite Structure

As described above, the magnetic material of the present invention has a composite structure having a soft magnetic phase and a hard magnetic phase.

Figure 2:
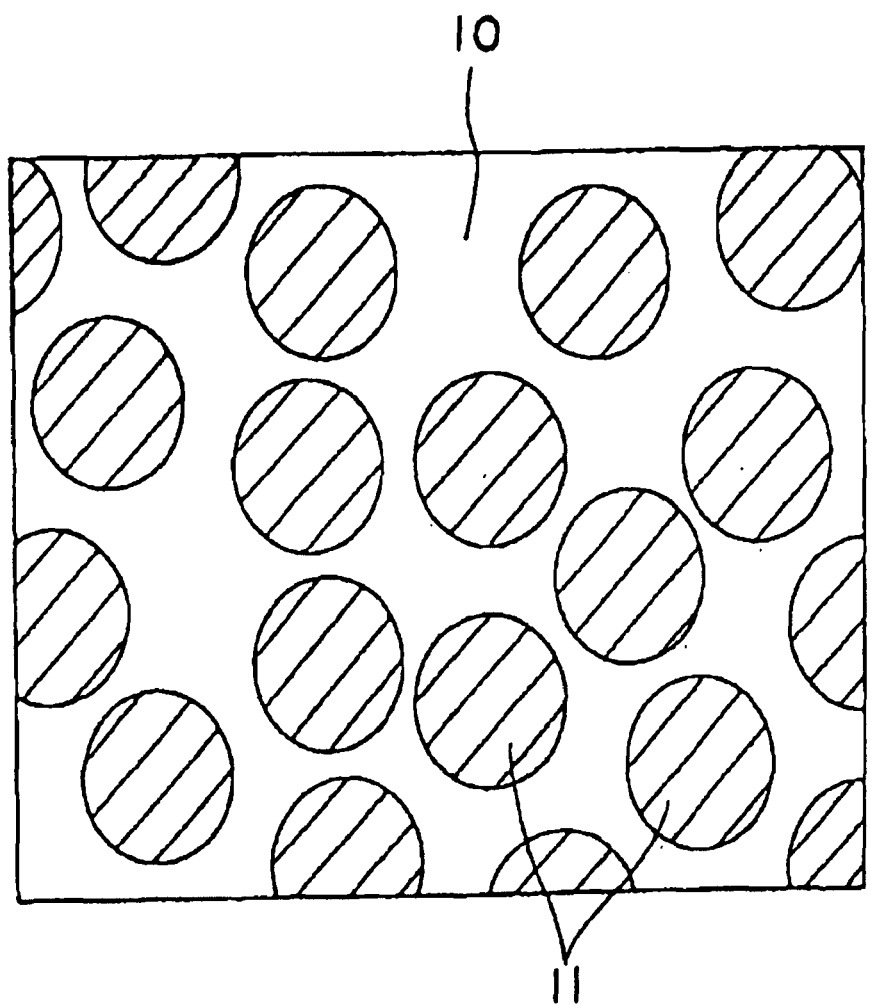
FIG. 2 is an illustration which schematically shows another example of a composite structure (nanocomposite structure) of magnetic powder according to the present invention.
Figure 3:
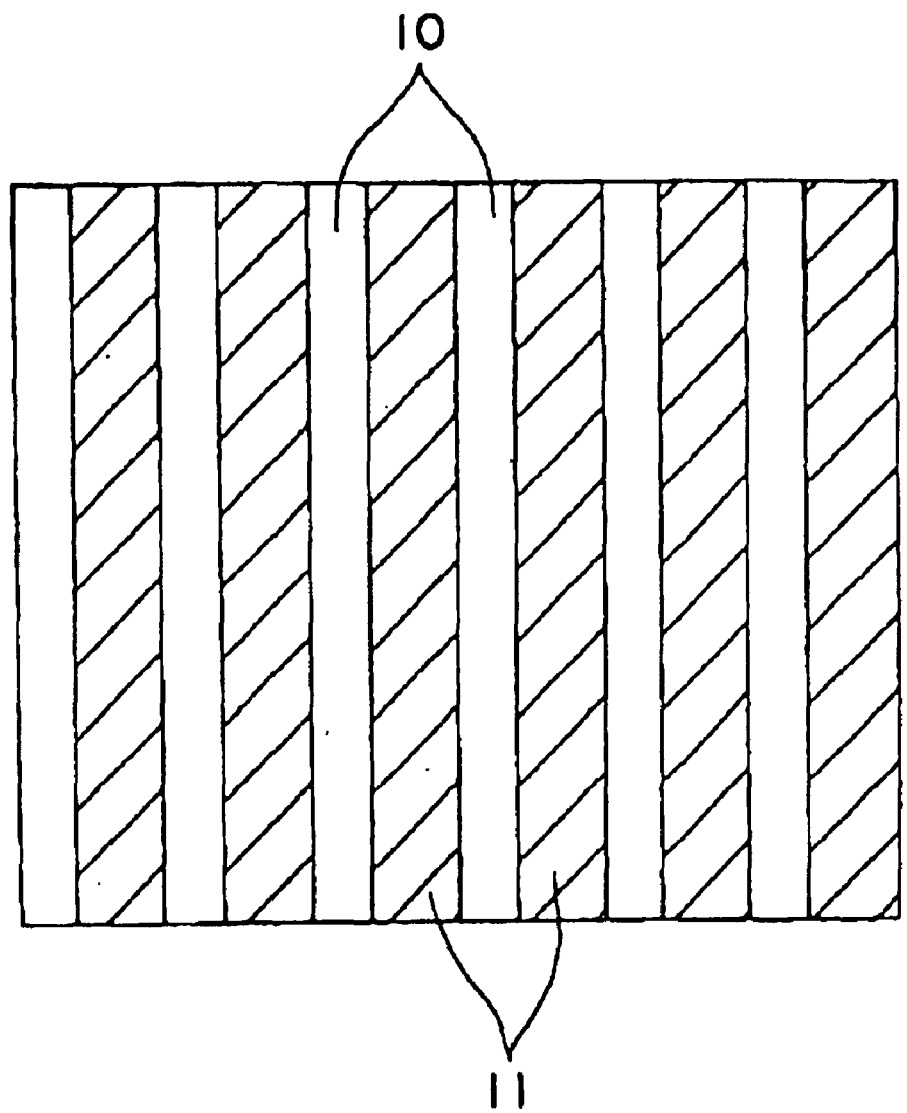
FIG. 3 is an illustration which schematically shows other example of a composite structure (nanocomposite structure) of magnetic powder according to the present invention.

In this composite structure (nanocomposite structure), a soft magnetic phase 10 and a hard magnetic phase 11 exist in a pattern (model) as shown in, for example, FIG. 1, FIG. 2 or FIG. 3, where the thickness of the respective phases and the grain size are on the order of nanometers. Further, the soft magnetic phase 10 and the hard magnetic phase 11 are arranged adjacent to each other (this also includes the case where these phases are adjacent through intergranular phases), which makes it possible to perform magnetic exchange interaction therebetween.

In such nanocomposite structure, it is preferable that the mean crystal grain size is 5 to 50 nm, and it is more preferable that the mean crystal grain size is 10 to 40 nm. If the mean crystal grain size is less than the lower limit value, the influence of the magnetic exchange interaction between the crystal grains too large, so that reversal of magnetization becomes easy, thus leading to the case that the coercive force is deteriorated.

On the other hand, if the mean crystal grain size exceeds the above upper limit, there is a case that the crystal grain size becomes coarse. Further, since the influence of the magnetic exchange interaction is weakened, there is a case that the magnetic flux density, coercive force, rectangularity and maximum energy product are deteriorated.

In this regard, it is to be noted that the patterns illustrated in FIG. 1 to FIG. 3 are only specific examples, and are not limited thereto. For example, the soft magnetic phase 10 and the hard magnetic phase 11 in FIG. 2 are interchanged to each other.

The magnetization of the soft magnetic phase readily changes its orientation by the action of an external magnetic field. Therefore, when the soft magnetic phase coexists with the hard magnetic phase, the magnetization curve for the entire system shows a stepped "serpentine curve" in the second quadrant of the B-H diagram. However, when the soft magnetic phase has a sufficiently small size, magnetization of the soft magnetic phase is sufficiently and strongly constrained through the coupling with the magnetization of the surrounding hard magnetic phase, so that the entire system exhibits functions like a hard magnetic phase.

A magnet having such a composite structure (nanocomposite structure) has mainly the following five features.
(1) In the second quadrant of the B-H diagram (J-H diagram), the magnetization springs back reversively (in this sense, such a magnet is also referred to as a "spring magnet").
(2) It has a satisfactory magnetizability, and it can be magnetized with a relatively low magnetic field.
(3) The temperature dependence of the magnetic properties is small as compared with the case where the system is constituted from a hard magnetic phase alone.
(4) The changes in the magnetic properties with the elapse of time are small.
(5) No deterioration in the magnetic properties is observable even if it is finely milled.

In the alloy composition described in the above, the hard magnetic phase and the soft magnetic phase are respectively composed of the followings, for instance.

The hard magnetic phase: $R_2TM_{14}B$ system (where, TM is a transit metal containing Fe or Fe and Co as its major components).

The soft magnetic phase: TM ($\alpha$-Fe or $\alpha$-(Fe, Co) in particular).

Manufacture of Magnetic Powders

As for the magnetic powders according to this invention, it is preferable that they are manufactured by quenching a molten alloy. In this case, it is more preferable that they are manufactured by milling a melt spun (quenched) ribbon obtained by quenching (cooling) and solidifying the molten alloy. An example of such a method will be described in the following.

Figure 4:
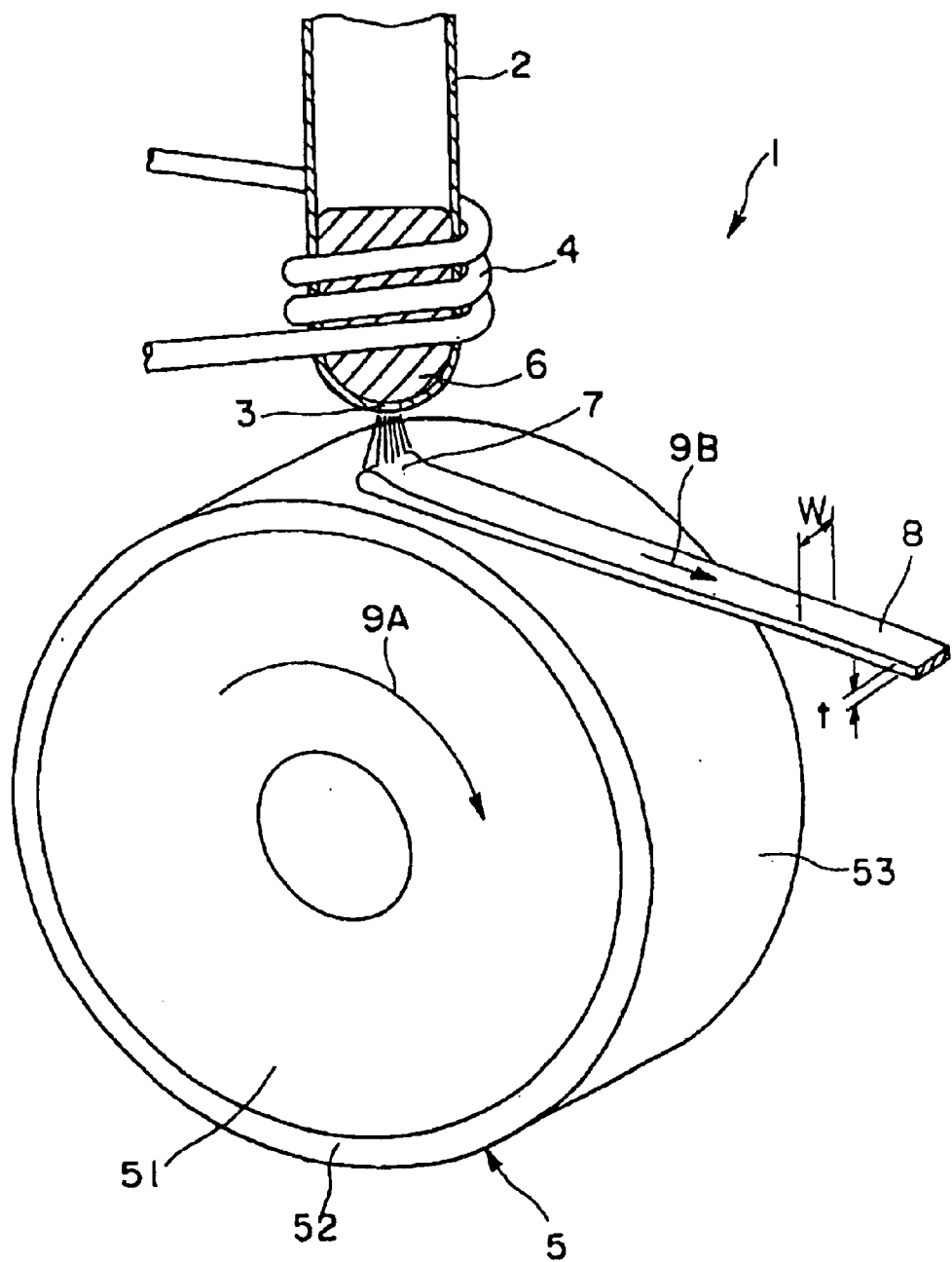
FIG. 4 is a perspective view which shows an example of the configuration of an apparatus (melt spinning apparatus) for manufacturing a magnetic material.
Figure 5:
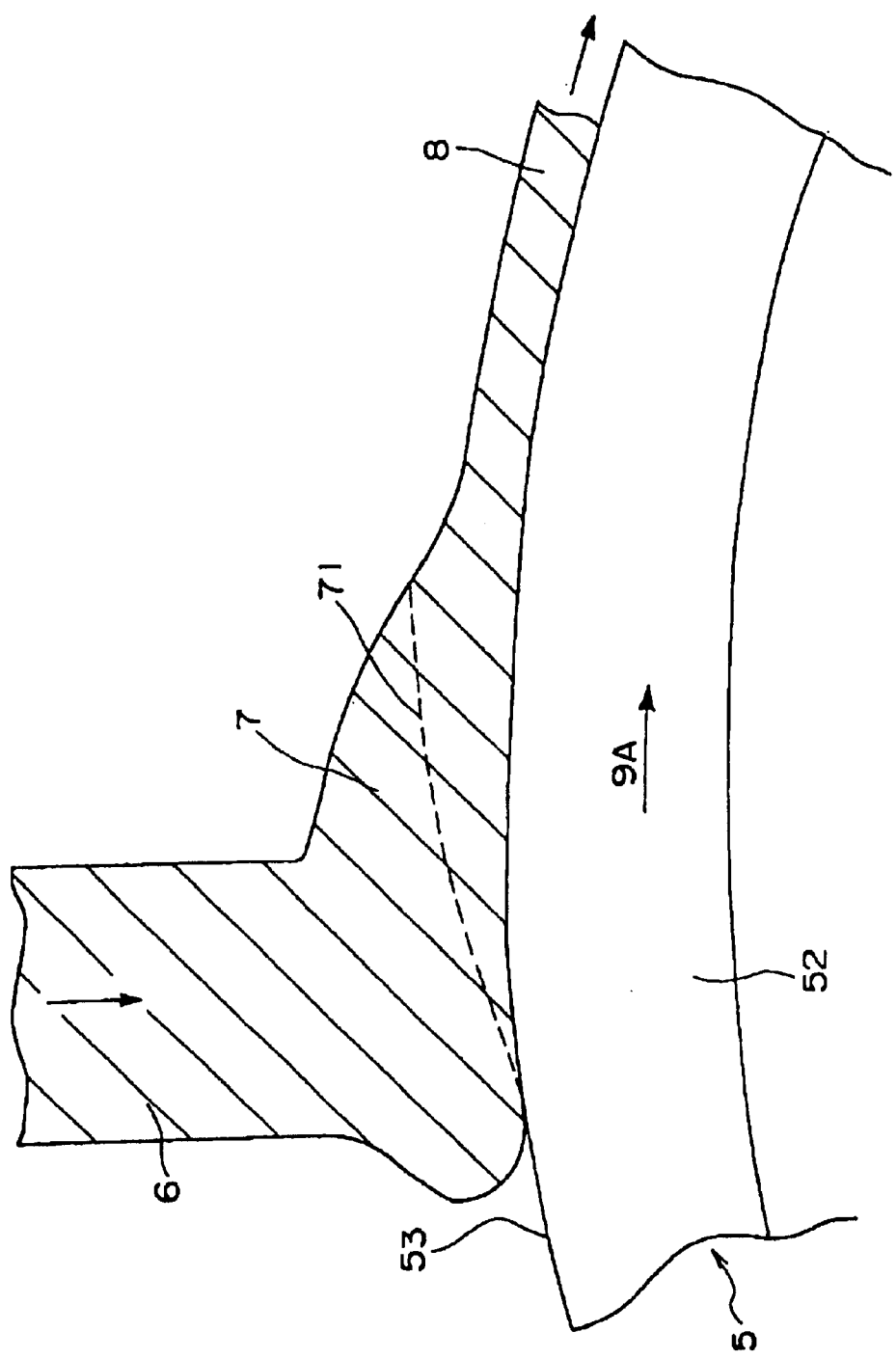
FIG. 5 is a sectional side view showing the situation in the vicinity of colliding section of a molten alloy with a cooling roll in the apparatus shown in FIG. 4.

FIG. 4 is a perspective view showing an example of the structure of an apparatus (melt spinning apparatus) for manufacturing a magnetic material by the quenching method using a single roll, and FIG. 5 is a sectional side view showing the situation in the vicinity of colliding section of the molten alloy with the cooling roll of the apparatus shown in FIG. 4.

As shown in FIG. 4, the melt spinning apparatus 1 is provided with a cylindrical body 2 capable of storing the magnetic material, and a cooling roll 5 which rotates in the direction of an arrow 9A in the figure relative to the cylindrical body 2. A nozzle (orifice) 3 which injects a molten alloy of the magnetic material is formed at the lower end of the cylindrical body 2.

In addition, a heating coil 4 is arranged on the outer periphery of the cylindrical body 2 in the vicinity of the nozzle 3, and the magnetic material in the cylindrical body 2 is melted by inductively heating the interior of the cylindrical body 2 through application of, for example, a high frequency wave to the coil 4.

The cooling roll 5 is constructed from a base part 51 and a surface layer 52 which forms a circumferential surface 53 of the cooling roll 5.

The base part 51 may be formed of the same material as that for the surface layer 52. However, it is preferred that the surface layer 52 is formed of a material having lower heat conductivity than that for the material for the base part 51.

Although there is no particular limitation on the material used for the base part 51, it is preferable that the base part 51 is formed of a metallic material with high heat conductivity such as copper or a copper alloy in order to make it possible to dissipate heat of the surface layer 52 as quickly as possible.

Examples of the surface layer 52 include a metallic thin layer of Cr, Ni, Pd, W or the like, a layer of metallic oxide of these metals and a ceramic layer. Among these layers, a ceramic layer is particularly preferred, since such ceramic layer makes it possible to reduce the difference in the cooling rates at the roll contact surface 81 of the melt spun ribbon 8 and at the free surface 82 thereof. Here, it is to be noted that the roll contact surface of the melt spun ribbon 8 means a surface of the melt spun ribbon 8 which is in contact with the cooling roll 5, and the free surface means the opposite surface of the roll contact surface.

Examples of the ceramics to be used for the ceramic layer include oxide ceramics such as $Al_2O_3$, $SiO_2$, $TiO_2$, $Ti_2O_3$, $ZrO_2$, $Y_2O_3$, barium titanate and strontium tinanate and the like; nitride ceramics such as AlN, $Si_3N_4$, TiN and BN and the like; carbide ceramics such as graphite, SiC, ZrC, $Al_4C_3$, $CaC_2$ and WC and the like; and mixture of two or more of these ceramics.

The surface layer 52 may be formed from a laminate structure comprised of a plurality of layers of different compositions, besides the single layer structure described above. In this case, it is preferred that the adjacent layers are well adhered or bonded to each other. For this purpose, these adjacent layers may contain the same element therein.

Further in the case where the surface layer 52 is formed into the single layer structure described above, it is not necessary for the composition of the material of the surface layer to have uniform distribution in the thickness direction thereof. For example, the contents of the constituents may be gradually changed in the thickness direction thereof (that is, graded materials may be used).

The average thickness of the surface layer 52 (in the case of the laminate structure, the total thickness thereof) is not limited to a specific value. However, it is preferred that the average thickness lies within the range of 0.5–50 $\mu$m, and more preferably 1–20 $\mu$m.

If the average thickness of the surface layer 52 is less than the lower limit value described above, there is a possibility that the following problems will be raised. Namely, depending on the material to be used for the surface layer 52, there is a case that cooling ability becomes too high. When such a material is used for the surface layer 52, a cooling rate becomes too large in the vicinity of the roll contact surface 81 of the melt spun ribbon 8 even though it has a considerably large thickness, thus resulting in the case that amorphous structure be produced at that portion. On the other hand, in the vicinity of the free surface 82 of the spun ribbon 8 where the heat conductivity is relatively low, the cooling rate becomes small as the thickness of the melt spun ribbon 8 increases, so that crystal grain size is liable to be coarse. Namely, in this case, the grain size is liable to be coarse in the vicinity of the free surface 82 of the obtained melt spun ribbon 8, and amorphous structure is liable to be produced in the vicinity of the roll contact surface 81 of the melt spun ribbon 8, which result in the case that satisfactory magnetic properties can not be obtained. In this regard, even if the thickness of the melt spun ribbon 8 is made small by increasing the peripheral velocity of the cooling roll 5, for example, in order to reduce the crystal grain size in the vicinity of the free surface 82 of the melt spun ribbon 8, this in turn leads to the case that the melt spun ribbon 8 has more random amorphous structure in the vicinity of the roll contact surface 81 of the obtained melt spun ribbon 8. In such a melt spun ribbon 8, there is a case that sufficient magnetic properties will not be obtained even if it is subjected to a heat treatment after manufacturing thereof.

Further, if the average thickness of the surface layer 52 exceeds the above upper limit value, the cooling rate becomes slow and thereby the crystal grain size becomes coarse, thus resulting in the case that magnetic properties are poor.

The melt spinning apparatus 1 described above is installed in a chamber (not shown), and it is operated preferably under the condition where the interior of the chamber is filled with an inert gas or other kind of gas. In particular, in order to prevent oxidation of a melt spun ribbon 8, it is preferable that the gas is an inert gas such as argon gas, helium gas, nitrogen gas or the like.

In the melt spinning apparatus 1, the magnetic material (alloy) is placed in the cylindrical body 2 and then melted by heating with the coil 4, and the molten alloy 6 is discharged from the nozzle 3. Then, as shown in FIG. 5, the molten alloy 6 collides with the circumferential surface 53 of the cooling roll 5, and after the formation of a puddle 7, the molten alloy 6 is cooled down rapidly to be solidified while dragged along the circumferential surface 53 of the rotating cooling roll 5, thereby forming a melt spun ribbon 8 continuously or intermittently. A roll surface 81 of the melt spun ribbon 8 thus formed is soon released from the circumferential surface 53, and the melt spun ribbon 8 proceeds in the direction of an arrow 9B in FIG. 4. The solidification interface 71 of the molten alloy is indicated by a broken line in FIG. 5.

The optimum range of the peripheral velocity of the cooling roll 5 depends upon the composition of the molten alloy, the structural material (composition) of the surface layer 52, and the surface condition of the circumferential surface 53 (especially, the wettability of the surface layer 52 with respect to the molten alloy 6), and the like. However, for the enhancement of the magnetic properties, a peripheral velocity in the range of 5 to 60 m/s is normally preferable, and 10 to 40 m/s is more preferable. If the peripheral velocity of the cooling roll 5 is less than the above lower limit value, the cooling rate of the molten alloy 6 (puddle 7) is decreased. This tends to increase the crystal grain sizes, thus leading to the case that the magnetic properties are lowered. On the other hand, when the peripheral velocity of the cooling roll 5 exceeds the above upper limit value, the cooling rate is too high, and thereby amorphous structure becomes dominant. In this case, the magnetic properties can not be sufficiently improved even if a heat treatment described below is given in the later stage.

It is preferred that thus obtained melt spun ribbon 8 has uniform width w and thickness t. In this case, the average thickness t of the melt spun ribbon 8 should preferably lie in the range of 10–40 $\mu$m and more preferably lie in the range of 12–30 $\mu$m. If the average thickness t is less than the lower limit value, amorphous structure becomes dominant, so that there is a case that the magnetic properties can not be sufficiently improved even if a heat treatment is given in the later stage. Further, productivity per an unit time is also lowered. On the other hand, if the average thickness t exceeds the above upper limit value, the crystal grain size at the side of the free surface 82 of the melt spun ribbon 8 tends to be coarse, so that there is a case that the magnetic properties are lowered.

Further, the obtained melt spun ribbon 8 may be subjected to at least one heat treatment for the purpose of, for example, acceleration of recrystallization of the amorphous structure and homogenization of the structure. The conditions of this heat treatment may be, for example, a heating at a temperature in the range of 400 to 900° C. for 0.2 to 300 min.

Moreover, in order to prevent oxidation, it is preferred that this heat treatment is performed in a vacuum or under a reduced pressure (for example, in the range of $1\times10^{-1}$ to $1\times10^{-6}$ Torr), or in a nonoxidizing atmosphere of an inert gas such as nitrogen gas, argon gas, helium gas or the like.

The melt spun ribbon (ribbon-shaped magnetic material) 8 obtained according to the manufacturing method as described above has a microcrystalline structure or a structure in which microcrystals are included in an amorphous structure, and exhibits excellent magnetic properties. The magnetic powder of the present invention is obtained by milling the thus manufactured melt spun ribbon 8.

The milling method of the melt spun ribbon is not particularly limited, and various kinds of milling or crushing apparatus such as ball mill, vibration mill, jet mill, and pin mill may be employed. In this case, in order to prevent oxidation, the milling process may be carried out under vacuum or reduced pressure (for example, under a reduce pressure of $1\times10^{-1}$ to $1\times10^{-6}$ Torr), or in a nonoxidizing atmosphere of an inert gas such as nitrogen, argon, helium, or the like.

The mean particle size of the magnetic powder is not particularly limited. However, in the case where the magnetic powder is used for manufacturing bonded magnets described later, in order to prevent oxidation of the magnetic powder and deterioration of the magnetic properties during the milling process, it is preferred that the mean particle size lies in the range of 0.5 to 150 $\mu$m, more preferably in the range of 0.5 to 60 $\mu$m, and still more preferably in the range of 1 to 50 $\mu$m.

In order to obtain a better moldability during the manufacturing process of the bonded magnet, it is preferable to give a certain degree of dispersion to the particle size distribution of the magnetic powder. By so doing, it is possible to reduce the void ratio (porosity) of the bonded magnet obtained. As a result, it is possible to raise the density and the mechanical strength of the bonded magnet as compared with other bonded magnet containing the same amount of the magnetic powder, thereby enabling to further improve the magnetic properties.

Thus obtained magnetic powder may be subjected to a heat treatment for the purpose of, for example, removing the influence of stress introduced by the milling process and controlling the crystal grain size. The conditions of the heat treatment are, for example, heating at a temperature in the range of 350 to 850° C. for 0.2 to 300 min.

In order to prevent oxidation of the magnetic powder, it is preferable to perform the heat treatment in a vacuum or under a reduced pressure (for example, in the range of $1\times10^{-1}$ to $1\times10^{-6}$ Torr), or In a nonoxidizing atmosphere of an inert gas such as nitrogen gas, argon gas, and helium gas.

Thus obtained magnetic powder has a satisfactory bindability with the binding resin (wettability of the binding resin). Therefore, when a bonded magnet is manufactured using the magnetic powder described above, the bonded magnet has a high mechanical strength and excellent heat stability (heat resistance) and corrosion resistance. Consequently, it can be concluded that the magnetic powder of the present invention is suitable for manufacture of bonded magnets.

In the above, the quenching method is described in terms of the single roll method, but the twin roll method may also be employed. Besides, other methods such as the atomizing method which uses gas atomization, the rotating disk method, the melt extraction method, and the mechanical alloying method (MA) may also be employed. Since such a melt spinning method can refine the metallic structure (crystal grains), it is effective for enhancing the magnetic properties, especially the coercive force or the like, of bonded magnets.

Bonded Magnets and Manufacture Thereof

Next, a description will be made with regard to the bonded magnet according to the present invention.

The bonded magnet of this invention is formed by mixing the magnetic powder with a binding resin and then subjecting the mixture to compaction molding.

As for the binding resin (binder), either of thermoplastic resins or thermosetting resins may be employed.

Examples of the thermoplastic resins include polyamid (example: nylon 6, nylon 46, nylon 66, nylon 610, nylon 612, nylon 11, nylon 12, nylon 6-12, nylon 6-66); thermoplastic polyimide; liquid crystal polymer such as aromatic polyester; poly phenylene oxide; poly phenylene sulfide; polyolefin such as polyethylene, polypropylene and ethylene-vinyl acetate copolymer; modified polyolefin; polycarbonate; poly methyl methacrylate; polyester such as poly ethylen terephthalate and poly butylene terephthalate; polyether; polyether ether ketone; polyetherimide; polyacetal; and copolymer, blended body, and polymer alloy having at least one of these materials as a main ingredient. In this case, a mixture of two or more kinds of these materials may be employed.

Among these resins, a resin containing polyamide as its main ingredient is particularly preferred from the viewpoint of especially excellent moldability and high mechanical strength. Further, a resin containing liquid crystal polymer and/or poly phenylene sulfide as its main ingredient is also preferred from the viewpoint of enhancing the heat resistance. Furthermore, these thermoplastic resins also have an excellent kneadability with the magnetic powder.

These thermoplastic resins provide an advantage in that a wide range of selection can be made. For example, it is possible to use a thermoplastic resin having a good moldability or to use a thermoplastic resin having good heat resistance and mechanical strength by appropriately selecting their kinds, copolymerization or the like.

On the other hand, examples of the thermosetting resins include various kinds of epoxy resins of bisphenol type, novolak type, and naphthalene-based, phenolic resin, urea resin, melamine resin, polyester (or unsaturated polyester) resin, polyimide resin, silicone resin, polyurethane resin, and the like. In this case, a mixture of two or more kinds of these materials may be employed.

Among these resins, the epoxy resin, phenolic resin, polyimide resin and silicone resin are preferable from the viewpoint of their special excellence in the moldability, high mechanical strength, and high heat resistance. In this case, the epoxy resin is especially preferable. These thermosetting resins also have an excellent kneadability with the magnetic powder and homogeneity (uniformity) in kneading.

These thermosetting resins may be either in a liquid state or in a solid (powdery) state at a room temperature when they are in an unhardened state.

The bonded magnet according to this invention described in the above may be manufactured, for example, as in the following. First, the magnetic powder, a binding resin and an additive (antioxidant, lubricant or the like) as needed are mixed and kneaded (warm kneading) to form a bonded magnet composite (compound). Then, thus obtained bonded magnet composite is put into a die of a compaction molding apparatus, and then it is compressed in a magnetic field or in a state free from magnetic field, thereby producing a compact having a desired shape of a magnet. When the binding resin used is a thermosetting type, the obtained mold body is hardened by heating or the like after molding.

This compaction molding is preferably carried out under the temperature that the binding resin is melted or softened (warm compaction molding).

The warm compaction molding is carried out, for example, by heating the die such that a temperature of the compound contained therein becomes a predetermined temperature at which the binding resin used is melted or softened.

In this case, the temperature of the die is preferably set to be a temperature higher than the softening temperature of the binding resin to be used. In particular, it is preferred that the temperature of the die is in the range of $t-(t+80)°$ C. when the melting point of the binding resin is $t°$ C. On the other hand, however, when the binding resin is a thermosetting resin and the hardening initiating temperature of the binding resin is lower than $(t+80)°$ C. the upper limit of the temperature of the die at the warm compacting molding is set to be a temperature that is lower than the hardening initiating temperature.

By carrying out the warm compaction molding at the temperatures as described above, fluidity of the compound upon compactification is improved, so that a bonded magnet having a small void ratio can be manufactured, thereby enabling to further improve magnetic properties. Further, mechanical strength of the bonded magnet can also be improved.

The molding pressure upon the compaction molding slightly differs depending on factors such as the temperature at the molding or the like, but preferably it is in the range of $1-25$ ton/cm$^2$, and more preferably in the range of $5-20$ ton/cm$^2$.

The void ratio of the thus obtained bonded magnet is preferably 5 vol % or less, and more preferably 3 vol % or less.

Since the compaction molding does not require so much fluidity of a compound as compared with the injection molding or extrusion molding, it becomes possible to increase the content of the magnetic powder contained in the bonded magnet. Further, as described above, the magnetic powder of the present invention has more excellent magnetic properties as compared with the conventional magnetic powder. Therefore, if a bonded magnet is manufactured from the magnetic powder of the present invention using the compaction molding, the bonded magnet is capable of possessing extremely excellent magnetic properties due to the synergistic effect by the magnetic powder and the compaction molding.

The content of the magnetic powder contained in the bonded magnet is not limited to a specific value, but preferably it should like in the range of 90–99.5 wt %, and more preferably in the range of 93–98.5 wt %.

The density $\rho$ of the bonded magnet is determined by factors such as the specific gravity of the magnetic powder contained in the magnet and the content of the magnetic powder, and void ratio (porosity) of the bonded magnet and the like. In the bonded magnets according to this invention, the density $\rho$ is not particularly limited to a specific value, but it is preferable to be in the range of 4.5–6.6 Mg/m$^3$, and more preferably in the range of 5.5–6.4 Mg/m$^3$.

As described above, in the present invention, even if the amount of the magnetic powder to be contained in the bonded magnet is decreased in order to improve moldability upon compaction molding, it is still possible to obtain a bonded magnet having excellent magnetic properties due to high magnetic performance of the magnetic powder itself.

Further, the shape, dimensions, and the like of the bonded magnet manufactured according to this invention are not particularly limited. For example, as to the shape, all shapes such as columnar, prism-like, cylindrical (ring-shaped), circular, plate-like, curved plate-like, and the like are acceptable. As to the dimensions, all sizes starting from large-sized one to ultraminuaturized one are acceptable. However, as repeatedly described in this specification, the present invention is particularly advantageous in miniaturization and ultraminiaturization of the bonded magnet.

In view of the advantages described above, it is preferred that the bonded magnet of the present invention is subject to multipolar magnetization so as to have multipoles.

Furthermore, in the present invention, it is preferred that the bonded magnet can satisfy the following conditions.

(1) The coercive force ($H_{CJ}$) of the bonded magnet (that is, the intrinsic coercive force at a room temperature) should lie in the range of 400 to 750 kA/m. In this case, it is preferred that the coercive force lies in the range of 430 to 720 kA/m. If the coercive force is lower than the lower limit value, demagnetization occurs conspicuously when a reverse magnetic field is applied depending upon the usage of the motor, and the heat resistance at a high temperature is deteriorated. On the other hand, if the coercive force exceeds the above upper limit value, magnetizability is deteriorated. Therefore, by setting the coercive force ($H_{CJ}$) to the above range, in the case where the bonded magnet (cylindrical magnet in particular) is subjected to multipolar magnetization, a satisfactory magnetization with a sufficiently high magnetic flux density can be accomplished even when a sufficiently high magnetizing field cannot be secured, which makes it possible to provide high performance bonded magnets, especially high performance bonded magnets for motors.

(2) Preferably, the bonded magnets should satisfy the following formula (I) between the maximum magnetic energy product $(BH)_{max}$ and the density $\rho$ ($Mg/m^3$).

$$2.40 \leq (BH)_{max}/\rho^2 [\times 10^{-9} \, J \cdot m^3/g^2] \quad (I)$$

In this connection, it is more preferable that the following formula (II) is satisfied between the maximum magnetic energy product $(BH)_{max}$ and the density $\rho(Mg/m^3)$ instead of the above formula (1), and it is most preferable that the following formula (III) is satisfied therebetween.

$$2.50 \leq (BH)_{max}/\rho^2 [\times 10^{-9} \, J \cdot m^3/g^2] \leq 3.20 \quad (II)$$

$$2.60 \leq (BH)_{max}/\rho^2 [\times 10^{-9} \, J \cdot m^3/g^2] \leq 3.10 \quad (III)$$

When the value of $(BH)_{max}/\rho^2 [\times 10^{-9} \, J \cdot m^3/g^2]$ is less than the lower limit value of the above formulas, it is not possible to obtain sufficient magnetic properties unless otherwise the density of the magnet is increased, that is the content of the magnetic powder in the magnet is increased. However, this in turn leads to problems in that available molding methods are limited, manufacturing cost is increased, and moldability is lowered due to a reduced amount of the binding resin. Further, when magnetic properties of a certain level are to be obtained, a volume (size) of the magnet is necessarily increased, which results in difficulty in miniaturizing devices such as motors.

(3) The bonded magnet should satisfy the following formula (IV) between the remanent magnetic flux density Br(T) and the density $\rho(Mg/m^3)$.

$$0.125 \leq Br/\rho [\times 10^{-6} \, T \cdot m^3/g] \quad (IV)$$

In this connection, it is more preferable that the following formula (V) is satisfied between the remanent magnetic flux density Br(T) and the density $\rho(Mg/m^3)$, and it is most preferable that the following formula (VI) is satisfied therebetween.

$$0.128 \leq Br/\rho [\times 10^{-6} \, T \cdot m^3/g] \leq 0.160 \quad (V)$$

$$0.130 \leq Br/\rho [\times 10^{-6} \, T \cdot m^3/g] \leq 0.155 \quad (VI)$$

When the value of $Br/\rho [\times 10^{-6} \, T \cdot m^3/g]$ is less than the lower limit value of the formula (I), it is not possible to obtain a sufficient magnetic flux density unless otherwise the density of the magnet is increased, that is the content of the magnetic powder in the magnet is increased. However, this in turn leads to problems in that manufacturing cost is increased and moldability is lowered due to a reduced amount of the binding resin. Further, when a magnetic flux density of a certain level is to be obtained, a volume of the magnet is necessarily increased, which results in difficulty in miniaturizing devices such as motors.

(4) The maximum magnetic energy product $(BH)_{max}$ of the bonded magnet should preferably be equal to or greater than 50 $kJ/m^3$, more preferably be equal to or greater than 60 $kJ/m^3$, and most preferably lie in the range of 70 to 120 $kJ/m^3$. If the maximum magnetic energy product $(BH)_{max}$ is less than 50 $kJ/m^3$, there is a case that sufficient torque will not be obtained depending upon the kind and structure when used for motors.

(5) It is preferable that the absolute value of the irreversible flux loss (that is, initial flux loss) is equal to or less than 6.2%, it is more preferable that the absolute value is equal to or less than 5.0%, and it is the most preferable that the absolute value is equal to or less than 4.0%. This makes it possible to obtain a bonded magnet having excellent heat stability (heat resistance).

EXAMPLES

Hereinbelow, the actual examples of the present invention will be described.

Example 1

Seven types of magnetic powders respectively having the alloy compositions shown in the attached TABLE 1 (sample Nos. 1 to 6) were obtained by the following method.

First, each of the materials Nd, Pr, Fe, Co, B and M was weighed, and then they were cast to produce a mother alloy ingot.

A melt spinning apparatus 1 as shown in FIG. 4 and FIG. 5 was prepared, and the mother alloy ingot was placed in a quartz tube 2 having a nozzle 3 (having a circular orifice of which diameter is 0.6 mm) at the bottom. After evacuating the interior of a chamber in which the melt spinning apparatus 1 is installed, an inert gas (Ar gas) was introduced to obtain an atmosphere with desired temperature and pressure.

The cooling roll 5 of the melt spinning apparatus 1 was provided with a surface layer 52 on the outer periphery of the base part 51 made of Cu. The surface layer 52 was formed of WC and had a thickness of about 7 μm. The diameter of the cooling roll 5 was 200 mm.

Then, the ingot sample in the quartz tube 2 was melted by high frequency induction heating. Further, the injecting pressure (differential pressure between the pressure of the atmosphere and the summed pressure of the inner pressure of the quartz tube 2 and the pressure that is exerted in proportion to the surface level of the molten alloy) and the circumferential velocity were adjusted, thereby obtaining a melt spun ribbon. The thickness of thus obtained melt spun ribbon was about 20 μm.

The melt spun ribbon was then coarsely crushed, and the powder was subjected to a heat treatment in an argon gas atmosphere at 680° C. for 300 sec. In this way, the six types of magnetic powders were obtained.

Next, for the purpose of adjustment of the particle size, each magnetic powder was milled by a milling machine (in an argon gas atmosphere). In this way, magnetic powders of the samples Nos. 1 to 6 each having an average particle diameter of 60 μm were obtained.

To analyze the phase structure of the obtained magnetic powders, each of the magnetic powders was subjected to X-ray diffraction using Cu-Kα line at the diffraction angle of 20°–60°. From the thus obtained diffraction pattern, the presence of diffracted peaks of a hard magnetic phase, $R_2(Fe.Co)_{14}B$ phase, and a soft magnetic phase, α-(Fe,Co) phase, were confirmed. Further, from the observation result using a transmission electron microscope (TEM), the formation of a composite structure (nanocomposite structure) was confirmed in each magnetic powder. Furthermore, in each of the magnetic powders, the mean crystal grain size thereof was measured. The results of these analysis and measurements are shown in the attached TABLE 1.

Next, each of the magnetic powders was mixed with an epoxy resin (melting point of 80° C.) and then they were kneaded at a temperature of 100° C. for 15 min, to obtain a composite (compound) for a bonded magnet. In this case, the compounding ratio (mixing ratio by weight) of the magnetic powder with respect to the epoxy resin was common to the respective bonded magnets. Specifically, in each of the bonded magnets, the content of the magnetic powder was about 98 wt %.

Then, each of the thus obtained compounds was crushed to be granular. Then, the granular substance was weighed and filled into a die of a press machine, and then it was subjected to a compaction molding (in the absence of a magnetic field) at the temperature of the die of 95° C. and under the pressure of 7 ton/cm². At this time, the binding resin was in the softened state (that is, s state that did not yet reached to a hardened state). After the compact was cooled, it was removed from the die. Then, the compact was hardened by heating at a temperature of 150° C. to obtain a bonded magnet of a columnar shape having a diameter of 10 mm and a height of 7 mm.

After pulse magnetization was performed for each of these bonded magnets under the magnetic field strength of 3.2 MA/m, magnetic properties (remanent magnetic flux density Br, intrinsic coercive force ($H_{CJ}$), and maximum magnetic energy product $(BH)_{max}$) were measured using a DC recording fluxmeter (manufactured and sold by Toei Industry Co. Ltd under the product code of TRF-5BH) under the maximum applied magnetic field of 2.0 MA/m. The temperature at the measurement was 23° C. (that is, a room temperature).

Next, the heat resistance (heat stability) of each of the bonded magnets was examined. The heat resistance was obtained by measuring the irreversible flux loss (initial flux loss) obtained when the bonded magnet was being left in the atmosphere of 100° C. for one hour and then the temperature was lowered to a room temperature, and then it was evaluated. In this connection, it is to be noted that smaller absolute value of the irreversible flux loss (initial flux loss) means more excellent heat resistance (heat stability).

The density ρ of each of the bonded magnets was also measured by the Archimedean principle.

The results of these measurements and the values of $(BH)_{max}/\rho^2$ and Br/ρ are shown in the attached TABLE 2.

As seen from the attached TABLE 2, each of the bonded magnets of the sample No. 2 to No. 5 (which are the bonded magnets according to the present invention) have excellent magnetic properties (that is, excellent remanent magnetic flux density Br, maximum magnetic energy product (BH) max and intrinsic coercive force $H_{CJ}$). Further, each of these bonded magnets has a small absolute value of the irreversible flux loss so that the heat stability (heat resistance) of each of these bonded magnets is excellent.

In contrast, each of the bonded magnets of the sample No. 1 and No. 6 (which are the bonded magnets according to Comparative Examples) exhibits poor magnetic properties and has a large absolute value of the irreversible flux loss so that the heat stability of these magnets is low.

Example 2

Each of the magnetic powders which were obtained in the Example 1 was mixed with a polyamide resin (Nylon 12: melting point of 178° C.) and then they were kneaded at a temperature of 225° C. for 15 min, to obtain a composite (compound) for a bonded magnet. In this case, the compounding ratio (mixing ratio by weight) of the magnetic powder with respect to the polyamide resin was common to the respective bonded magnets. Specifically, in each of the bonded magnets, the content of the magnetic powder was about 97 wt %.

Then, each of the thus obtained compounds was crushed to be granular. Then, the granular substance was weighed and filled into a die of a press machine, and then it was subjected to a compaction molding (in the absence of a magnetic field) at the temperature of the die of 210° C. and under the pressure of 6 ton/cm². At this time, the binding resin was in the melted state. After the compact was cooled, it was removed from the die, to obtain a bonded magnet of a columnar shape having a diameter of 10 mm and a height of 7 mm.

For each of these thus obtained bonded magnets, its magnetic properties, irreversible flux loss and magnetic flux density were measured.

The results of these measurements and the values of $(BH)_{max}/\rho^2$ and Br/ρ are shown in the attached TABLE 3.

As seen from TABLE 3, each of the bonded magnets of the sample No. 2 to No. 5 (which are the bonded magnets according to the present invention) have excellent magnetic properties (that is, excellent remanent magnetic flux density Br, maximum magnetic energy product $(BH)_{max}$ and intrinsic coercive force $R_{CJ}$). Further, each of these bonded magnets has a small absolute value of the irreversible flux loss so that the heat stability (heat resistance) of each of these bonded magnets is excellent.

In contrast, each of the bonded magnets of the sample No. 1 and No. 6 (which are the bonded magnets according to Comparative Examples) exhibits poor magnetic properties and has a large absolute value of the irreversible flux loss so that the heat stability of these magnets is low.

As described above, the bonded magnets which are manufactured using the magnetic powders containing a predetermined amount of M have excellent magnetic properties and heat stability (heat resistance).

Effects of the Invention

As described above, according to the present invention, the following effects can be obtained.

Since each of the magnetic powders contains a predetermined amount of M (at least one element selected from Ti, Cr, Nb, Mo, Hf, W, Mn, Zr and Dy) and has a composite structure having a soft magnetic phase and a hard magnetic phase, they can have high magnetization and exhibit excellent magnetic properties. In particular, intrinsic coercive force and rectangularity thereof are improved.

By appropriately selecting a combination of the elements M to be contained and the contents thereof, it is possible to obtain more excellent magnetic properties and heat resistance.

The absolute value of the irreversible flux loss is small and excellent heat resistance (heat stability) can be obtained.

Because of the high magnetic flux density that can be secured by this invention, it is possible to obtain a bonded magnet with high magnetic performance even if it is isotropic. In particular, since magnetic properties equivalent to or better than the conventional isotropic bonded magnet can be obtained with a bonded magnet of smaller volume as compared with the conventional isotropic bonded magnet, it is possible to provide a high performance motor of a smaller size.

Moreover, according to the magnetic powder of the present invention, a higher magnetic flux density can be secured, so that extremely high magnetic properties can be obtained when a bonded magnet is manufactured from the magnetic powder by means of the compaction molding.

Further, even in the case where a bonded magnet composition contains a relatively small amount of the magnetic powder, it is possible to obtain a bonded magnet having excellent magnetic properties. With this result, the dimensional accuracy, mechanical strength, corrosion resistance, heat resistance (heat stability) and the like can be improved in addition to the improvement in the moldability, so that it is possible to readily manufacture a bonded magnet with high reliability.

Since the magnetizability of the bonded magnet according to this invention is excellent, it is possible to magnetize a magnet with a lower magnetizing field. In particular, multipolar magnetization or the like can be accomplished easily and reliably, and further a high magnetic flux density can be obtained.

Finally, it is to be understood that the present invention is not limited to Examples described above, and many changes or additions may be made without departing from the scope of the invention which is determined by the following claims.

TABLE 1

| Sample No. | Alloy Composition | Average Crystal Grain Size (nm) |
|---|---|---|
| Comp Ex.1 | $(Nd_{0.8}Pr_{0.2})_{8.9}Fe_{bal}Co_{7.0}B_{5.8}$ | 54 |
| This Invention 2 | $(Nd_{0.8}Pr_{0.2})_{8.9}Fe_{bal}Co_{8.0}B_{5.7}Ti_{0.5}Cr_{0.7}Zr_{1.0}$ | 33 |
| This Invention 3 | $(Nd_{0.7}Pr_{0.3})_{9.1}Fe_{bal}Co_{5.0}B_{5.7}Nb_{1.0}Mo_{0.2}W a_{0.3}$ | 29 |
| This Invention 4 | $(Nd_{0.5}Pr_{0.5})_{9.0}Fe_{bal}Co_{5.0}B_{5.8}Dy_{0.8}Hf_{0.5}Mn_{0.7}$ | 31 |
| This Invention 5 | $(Nd_{0.4}Pr_{0.6})_{8.5}Fe_{bal}Co_{8.0}B_{5.5}Nb_{0.5}Zr_{0.5}Cr_{0.3}$ | 27 |
| Comp Ex.6 | $(Nd_{0.7}Pr_{0.3})_{8.5}Fe_{bal}Co_{5.0}B_{5.8}Dy_{1.8}W_{1.0}Hf_{0.7}$ | 56 |

TABLE 2

Example 1

| Sample No. | $\rho$ (Mg/m$^3$) | Br (T) | $H_{cJ}$ (kA/m) | $(BH)_{max}$ (kJ/m$^3$) | $(BH)_{max}/\rho^2$ ($\times 10^{-9}$ J·m$^3$/g$^2$) | Br/$\rho$ ($\times 10^{-6}$ T·m$^3$/g) | Irrespective Flux Loss (%) |
|---|---|---|---|---|---|---|---|
| Comp. Ex. 1 | 6.41 | 0.79 | 385 | 77.0 | 1.87 | 0.123 | −10.3 |
| This Invention 2 | 6.42 | 0.88 | 585 | 113 | 2.74 | 0.137 | −2.9 |
| This Invention 3 | 6.39 | 0.90 | 592 | 118 | 2.89 | 0.141 | −2.7 |
| This Invention 4 | 6.40 | 0.89 | 603 | 116 | 2.83 | 0.139 | −2.5 |
| This Invention 5 | 6.42 | 0.91 | 578 | 120 | 2.91 | 0.142 | −3.1 |
| Comp. Ex. 6 | 6.42 | 0.78 | 472 | 82 | 1.99 | 0.121 | −6.5 |

TABLE 3

Example 2

| Sample No. | $\rho$ (Mg/m$^3$) | Br (T) | $H_{cJ}$ (kA/m) | $(BH)_{max}$ (kJ/m$^3$) | $(BH)_{max}/\rho^2$ ($\times 10^{-9}$ J·m$^3$/g$^2$) | Br/$\rho$ ($\times 10^{-6}$ T·m$^3$/g) | Irrespective Flux Loss (%) |
|---|---|---|---|---|---|---|---|
| Comp. Ex. 1 | 6.25 | 0.77 | 378 | 74 | 1.89 | 0.123 | −10.2 |
| This Invention 2 | 6.26 | 0.86 | 588 | 107 | 273 | 0.137 | −2.8 |
| This Invention 3 | 6.24 | 0.88 | 590 | 111 | 2.85 | 0.141 | −2.8 |
| This Invention 4 | 6.26 | 0.87 | 605 | 109 | 2.78 | 0.139 | −2.4 |
| This Invention 5 | 6.25 | 0.89 | 575 | 115 | 2.94 | 0.142 | −3.1 |
| Comp. Ex. 6 | 6.25 | 0.76 | 470 | 78 | 2.00 | 0.122 | −6.6 |

What is claimed is:

1. Magnetic powder composed of an alloy composition represented by $R_x(Fe_{1-a}Co_a)_{100-x-y-z}B_yM_z$ (where R is at least one kind of rare-earth element excepting Dy, M is at least one kind of element selected from Ti, Cr, Nb, V, Mo, Hf, W, Mn, Zr and Dy, x is 7.1–9.9 at %, y is 4.6–8.0 at %, z is 0.1–3.0 at %, and a is 0–0.30), and the magnetic powder being constituted from a composite structure having a soft magnetic phase and a hard magnetic phase, wherein when the magnetic powder is mixed with a binding resin and then the mixture is subjected to injection molding or extrusion molding to form a bonded magnet having a density $\rho$[Mg/m$^3$], a maximum magnetic energy product $(BH)_{max}$[kJ/m$^3$] of the bonded magnet at room temperature satisfies a relationship represented by the formula of $(BH)_{max}/\rho^2$ [×10$^{-9}$J·m$^3$/g$^2$]≧2.10, and an intrinsic coercive force $H_{CJ}$ of the bonded magnet at room temperature is in a range of 400–760 kA/m.

2. The magnetic powder as claimed in claim 1, wherein a remanent magnetic flux density Br[T] of the bonded magnet at room temperature satisfies a relationship represented by the formula of Br/$\rho$[×10$^{-6}$T·m$^3$/g]≧0.125.

3. Magnetic powder composed of an alloy composition represented by $R_x(Fe_{1-a}Co_a)_{100-x-y-z}B_yM_z$ (where R is at least one kind of rare-earth element excepting Dy, M is a least one kind of element selected from Ti, Cr, Nb, V, Mo, Hf, W, Mn, Zr and Dy, x is 7.1–9.9 at %, y is 4.6–8.0 at %, z is 0.1–3.0 at %, and a is 0–0.30), and the magnetic powder being constituted from a composite structure having a soft magnetic phase and a hard magnetic phase, wherein when the magnetic powder is mixed with a binding resin and then the mixture is subjected to injection molding or extrusion molding to form a bonded magnet having a density $\rho[Mg/m^3]$, a remanent magnetic flux density Br[T] of the bonded magnet at room temperature satisfies a relationship represented by the formula of $Br/\rho$ $[\times 10^{-6} T \cdot m^3/g] \geq 0.125$ and an intrinsic coercive force $H_{CJ}$ of the bonded magnet at room temperature is in a range of 400–760 kA/m.

4. The magnetic powder as claimed in claim 1, wherein the magnetic powder is obtained by milling a melt spun ribbon.

5. The magnetic powder as claimed in claim 4, wherein a thickness of the melt spun ribbon is 10–40 μm.

6. The magnetic powder as claimed in claim 4, wherein the melt spun ribbon is obtained by colliding a molten alloy of a magnetic material onto a circumferential surface of a cooling roll which is rotating to cool and then solidify it.

7. The magnetic powder as claimed in claim 6, wherein the cooling roll includes a roll base made of a metal or an alloy and an outer surface layer provided on an outer peripheral portion of the roll base to constitute the circumferential surface, in which the outer surface layer of the cooling roll has a heat conductivity lower than a heat conductivity of the roll base.

8. The magnetic powder as claimed in claim 7, wherein the outer surface layer of the cooling roll is formed of a ceramic.

9. The magnetic powder as claimed in claim 1, wherein the magnetic powder has been subjected to a heat treatment at least once during a manufacturing process or after its manufacture.

10. The magnetic powder as claimed in claim 1, wherein a mean crystal grain size of the magnetic powder is 5–50 nm.

11. The magnetic powder as claimed in claim 3, wherein a thickness of the melt spun ribbon is 10–40 μm.

12. The magnetic powder as claimed in claim 11, wherein the melt spun ribbon is obtained by colliding a molten alloy of a magnetic material onto a circumferential surface of a cooling roll which is rotating to cool and then solidify it.

13. The magnetic powder as claimed in claim 12, wherein the cooling roll includes a roll base made of a metal or alloy and an outer surface layer provided on an outer peripheral portion of the roll base to constitute the circumferential surface, in which the outer surface layer of the cooling roll has a heat conductivity lower than a heat conductivity of the roll base.

14. The magnetic powder as claimed in claim 13, wherein the outer surface layer of the cooling roll is formed of a ceramic.

15. The magnetic powder as claimed in claim 3, wherein said R comprises rare-earth elements mainly containing Nd and/or Pr.

16. The magnetic powder as claimed in claim 3, wherein the magnetic powder is subjected to a heat treatment at least once during a manufacturing process or after its manufacture.

17. The magnetic powder as claimed in claim 3, wherein a mean crystal grain size of the magnetic powder is 5–50 nm.

18. The magnetic powder as claimed in claim 3, wherein an average particle size of the magnetic powder is 0.5–150 μm.

* * * * *

UNITED STATES PATENT AND TRADEMARK OFFICE
CERTIFICATE OF CORRECTION

| | | |
|---|---|---|
| PATENT NO. | : 6,979,374 B2 | Page 1 of 4 |
| APPLICATION NO. | : 09/871600 | |
| DATED | : December 27, 2005 | |
| INVENTOR(S) | : Arai et al. | |

It is certified that error appears in the above-identified patent and that said Letters Patent is hereby corrected as shown below:

Title Page, Item (56) References Cited
Other Publication Reference No. 4, "Change, W.C. et al." should be --Chang, W.C. et al.--.

Column 10
Line 12, Should "strontium tinanate" should be --strontium titanate--

Column 12
Line 10, "reduce" should be --reduced--.

Column 12
Line 12, "60" should be --80--.

Column 12
Line 41, "In" should be --in--.

Column 14
Line 42, After "should" insert --be--.

Column 16
Line 64, "(in" should be --in--.

Column 17
Line 29, "s" should be --a--.

Column 17
Line 30, "reached" should be --reach--.

Column 17
Lines 63-64, "(BH)max" should be --$(BH)_{max}$--.

Column 18
Line 38, "$R_{CJ}$" should be --$H_{CJ}$--.

Column 20
Line 8, "$Wa_{03}$" should be --$W_{03}$--.

Column 20
Table 2, Line 2, Col. 6, "$(BH)_{max}/\rho_2$" should be --$(BH)_{max}/P^2$--.

UNITED STATES PATENT AND TRADEMARK OFFICE
CERTIFICATE OF CORRECTION

PATENT NO. : 6,979,374 B2
APPLICATION NO. : 09/871600
DATED : December 27, 2005
INVENTOR(S) : Arai et al.

It is certified that error appears in the above-identified patent and that said Letters Patent is hereby corrected as shown below:

Columns 20-22
Lines 44-34, Delete Claims 1-18 and insert:

-- 1. A magnetic powder comprising:
an alloy composition represented by $R_x(Fe_{1-a}Co_a)_{100-x-y-z}B_yM_z$ (where R is at least one rare-earth element selected from the group consisting of Nd and Pr, a ratio of Pr with respect to a total mass of R is in the range of 20-60%, M is at least one element selected from Ti, Cr, Nb, Mo, Hf, W, Mn, and Zr, x is 7.1 – 9.9 at%, y is 4.6 – 8.0 at%, z is 0.1 – 3.0 at %, and a is 0 – 0.30);
wherein the magnetic powder further comprises a composite structure having a soft magnetic phase and a hard magnetic phase;
an average particle size of the magnetic powder is 1-50 μm; and
when the magnetic powder is mixed with a binding resin and then the mixture is subjected to compaction molding to form a bonded magnet having a density $\rho[Mg/m^3]$, a maximum magnetic energy product $(BH)max[kJ/m^3]$ of the bonded magnet at room temperature satisfies the relationship represented by the formula of $(BH)max/\rho^2[x10^{-9}J \cdot m^3/g^2] \geq 2.40$, and the intrinsic coercive force $H_{CJ}$ of the bonded magnet at room temperature is in the range of 430 – 750 kA/m.

2. The magnetic powder as claimed in claim 1, wherein the remanent magnetic flux density Br[T] of the bonded magnet at room temperature satisfies the relationship represented by the formula of $Br/\rho[x10^{-6}T \cdot m^3/g] \geq 0.125$.

3. A magnetic powder comprising:
an alloy composition represented by $R_x(Fe_{1-a}Co_a)_{100-x-y-z}B_yM_z$ (where R is at least one rare-earth element selected from the group consisting of Nd and Pr, a ratio of Pr with respect to a total mass of R is in the range of 20-60%, M is at least one element selected from Ti, Cr, Nb, Mo, Hf, W, Mn, and Zr, x is 7.1 – 9.9 at%, y is 4.6 – 8.0 at%, z is 0.1 – 3.0 at%, and a is 0 – 0.30);
wherein the magnetic powder further comprises a composite structure having a soft magnetic phase and a hard magnetic phase;
an average particle size of the magnetic powder is 1-50 μm; and
when the magnetic powder is mixed with a binding resin and then the mixture is subjected to compaction molding to form a bonded magnet having a density $\rho[Mg/m^3]$, a remanent magnetic flux density Br[T] of the bonded magnet at a room temperature satisfies the relationship represented by the formula of $Br/\rho [x10^{-6}T \cdot m^3/g] \geq 0.125$ and the intrinsic coercive force $H_{CJ}$ of the bonded magnet at room temperature is in the range of 430 – 750 kA/m.

UNITED STATES PATENT AND TRADEMARK OFFICE
CERTIFICATE OF CORRECTION

PATENT NO. : 6,979,374 B2
APPLICATION NO. : 09/871600
DATED : December 27, 2005
INVENTOR(S) : Arai et al.

It is certified that error appears in the above-identified patent and that said Letters Patent is hereby corrected as shown below:

4. The magnetic powder as claimed in claim 1, wherein the magnetic powder has been obtained by milling a melt spun ribbon.

5. The magnetic powder as claimed in claim 4, wherein the thickness of the melt spun ribbon is 10 -40μm.

6. The magnetic powder as claimed in claim 4, wherein the melt spun ribbon has been obtained by colliding a molten alloy of a magnetic material onto a circumferential surface of a cooling roll which is rotating to cool and then solidify the molten alloy.

7. The magnetic powder as claimed in claim 6, wherein the cooling roll includes a roll base made of a metal or an alloy and an outer surface layer provided on an outer peripheral portion of the roll base to constitute the circumferential surface, in which the outer surface layer of the cooling roll has a heat conductivity lower than the heat conductivity of the roll base.

8. The magnetic powder as claimed in claim 7, wherein the outer surface layer of the cooling roll is formed of a ceramic.

9. The magnetic powder as claimed in claim 1, wherein the magnetic powder has been subjected to a heat treatment at least once during the manufacturing process or after the manufacture of the magnetic powder.

10. The magnetic powder as claimed in claim 1, wherein the mean crystal grain size of the magnetic powder is 5 – 50nm.

11. The magnetic powder as claimed in claim 3, wherein the magnetic powder has been obtained by milling a melt spun ribbon.

12. The magnetic powder as claimed in claim 3, wherein the thickness of the melt spun ribbon is 10 - 40μm.

13. The magnetic powder as claimed in claim 11, wherein the melt spun ribbon has been obtained by colliding a molten alloy of a magnetic material onto a circumferential surface of a cooling roll which is rotating to cool and then solidify the molten alloy.

UNITED STATES PATENT AND TRADEMARK OFFICE
CERTIFICATE OF CORRECTION

PATENT NO. : 6,979,374 B2
APPLICATION NO. : 09/871600
DATED : December 27, 2005
INVENTOR(S) : Arai et al.

It is certified that error appears in the above-identified patent and that said Letters Patent is hereby corrected as shown below:

14. The magnetic powder as claimed in claim 13, wherein the cooling roll includes a roll base made of a metal or alloy and an outer surface layer provided on an outer peripheral portion of the roll base to constitute the circumferential surface, in which the outer surface layer of the cooling roll has a heat conductivity lower than the heat conductivity of the roll base.

15. The magnetic powder as claimed in claim 14, wherein the outer surface layer of the cooling roll is formed of a ceramic.

16. The magnetic powder as claimed in claim 3, wherein the magnetic powder is constituted from a composite structure having a soft magnetic phase and a hard magnetic phase.

17. The magnetic powder as claimed in claim 3, wherein the magnetic powder has been subjected to a heat treatment at least once during the manufacturing process or after the manufacture of the magnetic powder.

18. The magnetic powder as claimed in claim 3, wherein the mean crystal grain size of the magnetic powder is 5 – 50nm.--

Signed and Sealed this

Twenty-ninth Day of May, 2007

JON W. DUDAS
*Director of the United States Patent and Trademark Office*